(12) United States Patent
Hitzelberger et al.

(10) Patent No.: US 9,463,972 B2
(45) Date of Patent: Oct. 11, 2016

(54) DOCKING STATION FOR A BEVERAGE DISPENSER HAVING A RESERVOIR

(71) Applicant: General Electric Company, Schenectady, NY (US)

(72) Inventors: Joel Erik Hitzelberger, Louisville, KY (US); Bart Andrew Nuss, Fisherville, KY (US); Alan Joseph Mitchell, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 124 days.

(21) Appl. No.: 14/536,997

(22) Filed: Nov. 10, 2014

(65) Prior Publication Data

US 2016/0130131 A1    May 12, 2016

(51) Int. Cl.

| | |
|---|---|
| *B67D 7/78* | (2010.01) |
| *B67D 7/76* | (2010.01) |
| *A47J 31/56* | (2006.01) |
| *C02F 1/00* | (2006.01) |
| *B67D 1/00* | (2006.01) |

(52) U.S. Cl.
CPC ............ *B67D 7/78* (2013.01); *A47J 31/56* (2013.01); *B67D 1/0014* (2013.01); *B67D 7/76* (2013.01); *C02F 1/003* (2013.01); *B67D 2210/0001* (2013.01)

(58) Field of Classification Search
CPC ........ A47J 31/44; A47J 31/56; A47J 31/446; A47J 31/4457

USPC ............... 141/18, 95, 198; 99/279, 280; 222/146.1, 160

See application file for complete search history.

(56) References Cited

U.S. PATENT DOCUMENTS

| | | | | |
|---|---|---|---|---|
| 4,653,390 | A | * | 3/1987 | Hayes .................. A47J 31/56 392/442 |
| 5,063,836 | A | * | 11/1991 | Patel ...................... A47J 31/56 99/281 |
| 5,976,363 | A | * | 11/1999 | Monroe ................ B01D 61/08 210/109 |
| 6,752,069 | B1 | | 6/2004 | Burke et al. |
| 7,228,066 | B2 | * | 6/2007 | Pope .................. A47J 31/4475 392/441 |
| 7,503,253 | B2 | * | 3/2009 | Rahn .................... A47J 31/106 426/433 |
| 7,597,215 | B2 | * | 10/2009 | Sleiman ............... B67D 1/0009 141/198 |
| 8,146,485 | B2 | | 4/2012 | Ozanne et al. |
| 8,490,540 | B2 | * | 7/2013 | Webster ................ A47J 31/56 99/280 |
| 2008/0000357 | A1 | * | 1/2008 | Yang .................. A47J 31/0684 99/279 |
| 2015/0132458 | A1 | * | 5/2015 | Lee ........................ A23F 5/262 426/433 |

* cited by examiner

*Primary Examiner* — Timothy L Maust
(74) *Attorney, Agent, or Firm* — Dority & Manning, P.A.

(57) ABSTRACT

A docking station for a beverage dispenser having a reservoir is provided. The docking station includes an inlet conduit that extends from a pressurized water source to a spout of the docking station. A removable water filter is coupled to the inlet conduit in order to filter the flow of water through the inlet conduit.

17 Claims, 7 Drawing Sheets

DOCKING STATION FOR A BEVERAGE DISPENSER HAVING A RESERVOIR

FIELD OF THE INVENTION

The present subject matter relates generally to docking stations for beverage dispensers with reservoirs.

BACKGROUND OF THE INVENTION

Single serve beverage dispensers (SSBDs) are increasingly popular and have become ubiquitous on kitchen countertops. Certain SSBDs are loaded with capsules or pods that allow users to brew or mix an individual-size, unique, hot or cold beverage. Thus, SSBDs may provide a single cup of coffee to users who do not consume or desire an entire pot of coffee. In order to provide single beverages, SSBDs generally dispense small volumes of liquid (e.g., between eight and sixteen ounces) for each beverage. To permit consecutive preparation of beverages and decrease preparation time, certain SSBDs include a removable storage reservoir. The storage reservoir is generally sized to between four and eight dispenses worth of water therein.

Chlorine and chloramine are commonly added to water by municipalities to act as a biocide and hinder bio-growth within water used in SSBDs. Despite its hygienic benefits, users of SSBDs generally prefer the taste of water without chlorine and chloramine. Thus, reducing chlorine and chloramine levels in water directed into the storage reservoir may improve a taste of the water and an associated beverage.

Filtering water to remove chlorine and chloramine poses certain challenges. For example, activated carbon is commonly used to reduce chlorine and chloramine levels within water. However, forcing water through an activated carbon filter medium can require pressurizing the water, and water within the storage reservoir is generally unpressurized.

Accordingly, an apparatus with features for reducing chlorine and/or chloramine levels within water in a reservoir of an associated beverage dispenser would be useful would be useful. In addition, an apparatus with features for automatically filling a reservoir of an associated beverage dispenser with water having reduced chlorine and/or chloramine levels would be useful.

BRIEF DESCRIPTION OF THE INVENTION

The present subject matter provides a docking station for a beverage dispenser having a reservoir. The docking station includes an inlet conduit that extends from a pressurized water source to a spout of the docking station. A removable water filter is coupled to the inlet conduit in order to filter the flow of water through the inlet conduit. Additional aspects and advantages of the invention will be set forth in part in the following description, or may be apparent from the description, or may be learned through practice of the invention.

In a first exemplary embodiment, a docking station for a beverage dispenser having a reservoir is provided. The docking station includes a base. A spout is mounted to the base. The spout is configured for selectively directing a flow of water into the reservoir of the beverage dispenser. An inlet conduit extends to the spout within the base. The inlet conduit is configured for connecting to a pressurized water supply in order to direct the flow of water to the spout from the pressurized water supply. A valve is coupled to the inlet conduit. The valve is configured for regulating the flow of water through the inlet conduit to the spout. A removable water filter is positioned within the base and is coupled to the inlet conduit in order to filter the flow of water through the inlet conduit.

In a second exemplary embodiment, a docking station for a beverage dispenser having a reservoir is provided. The docking station includes a base. A spout is mounted to the base such that the spout is positioned for selectively directing a flow of water into the reservoir of the beverage dispenser. An inlet conduit is at least partially disposed within the base. The inlet conduit is configured for extending between an external pressurized water source and the spout through the base. The inlet conduit is configured for connecting to the external pressurized water supply in order to direct the flow of water to the spout from the pressurized water supply. A valve is positioned within the base. The valve is coupled to the inlet conduit. The valve is configured for opening and closing in order to adjust the flow of water through the inlet conduit to the spout. A manifold is mounted to the base and is coupled to the inlet conduit. A removable water filter cartridge is mounted to the manifold such that the manifold directs the flow of water into the removable water filter cartridge. The removable water filter cartridge filters the flow of water through the inlet conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
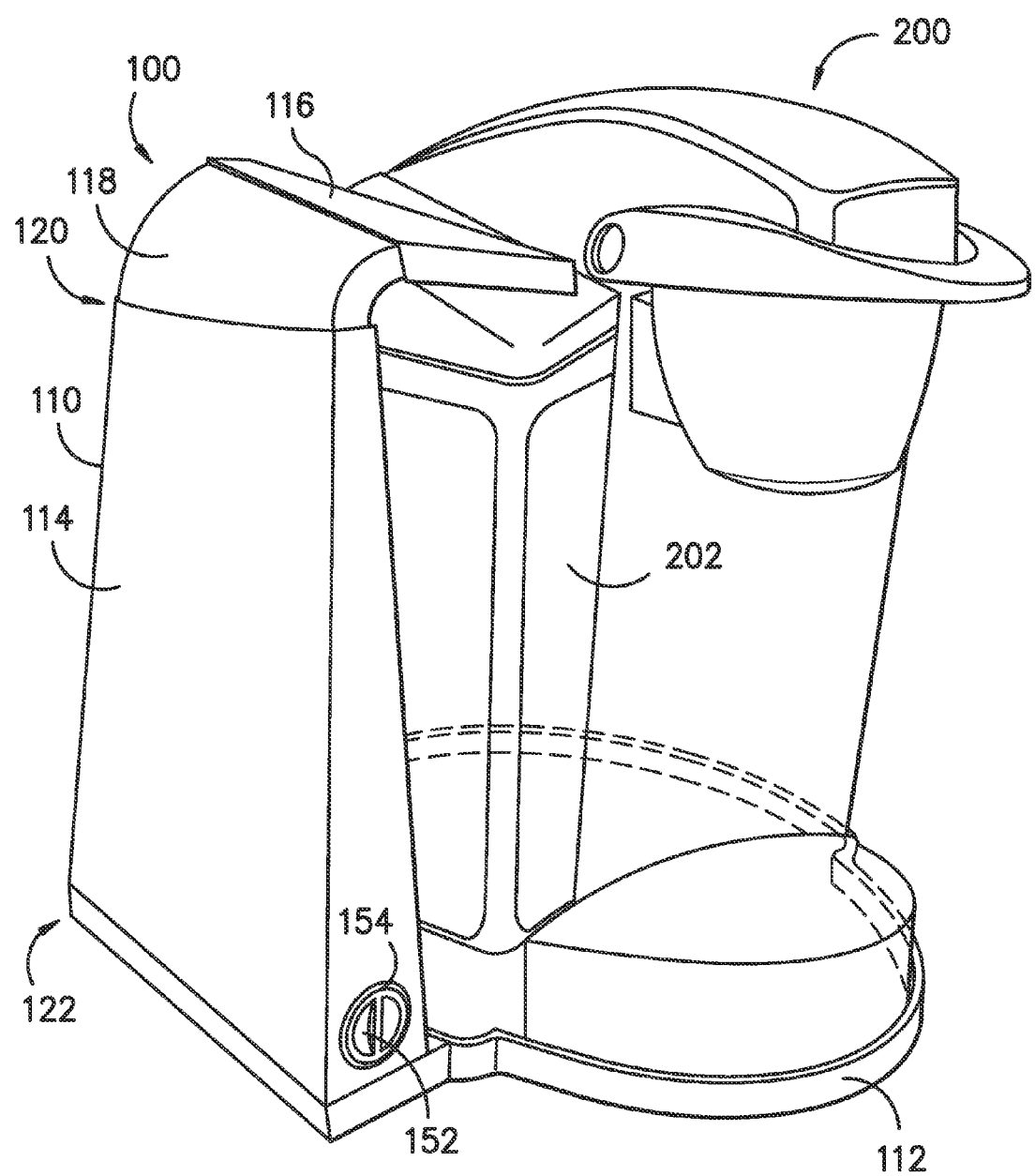
FIG. 1 provides a front, perspective view of a docking station according to an exemplary embodiment of the present subject matter with a beverage dispenser having a reservoir positioned on the exemplary docking station.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of a docking station 100 according to an exemplary embodiment of the present subject matter with a beverage dispenser 200 having a reservoir 202 positioned on docking station 100. Beverage dispenser 200 is generally referred to as a "single serve beverage dispenser" and receives capsules or pods with flavorings therein that are brewed or mixed with hot or cold water to provide a hot or cold beverage. As an example, beverage dispenser 200 may be a KEURIG® brand single-cup coffee brewing system or a VERISMO® brand single-cup coffee brewing system. However, docking station 100 may be used with and/or configured to work with any suitable beverage dispenser. Thus, while described below in the context of beverage dispenser 200. It should be understood that docking station 100 may be used with any other suitable beverage dispenser having a reservoir in alternative exemplary embodiments.

As may be seen in FIG. 1, docking station 100 includes a base 110. Base 110 includes a pan or tray 112, a tower 114 and a projection 116. Base 110 also extends between a top portion 120 and a bottom portion 122, e.g., along a vertical direction. Tray 112 is positioned at or adjacent bottom portion 122 of base 110. Tray 112 is sized for supporting beverage dispenser 200 thereon. Thus, beverage dispenser 200 may be positioned on or within tray 112. Tower 114 is positioned adjacent and/or mounted to tray 112 and extends upwardly, e.g., beside beverage dispenser 200, between the top and bottom portions 120, 122 of base 110. Projection 116 is positioned at or adjacent top portion 120 of base 110 and extends from tower 114, e.g., over reservoir 202 of beverage dispenser 200. In particular, projection 116 may be selectively positionable over reservoir 202 of beverage dispenser 200. Base 110 may also include a flexible neck 118 that extends between tower 114 of projection 116 in order to pivotally couple projection 116 to tower 114 and permit placement of at least a portion of projection 116 over reservoir 202 of beverage dispenser 200.

Figure 2:
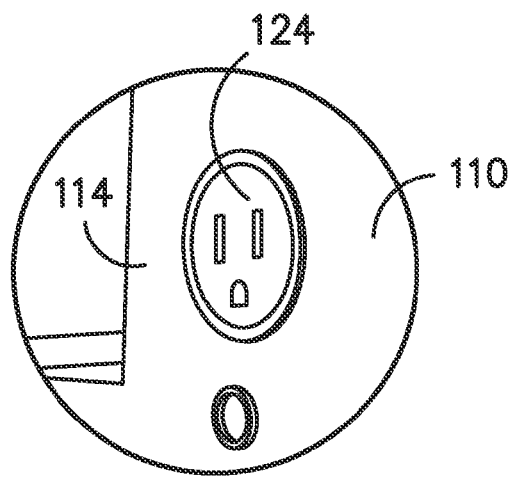
FIG. 2 provides a rear, partial perspective view of a socket of the exemplary docking station of FIG. 1.

FIG. 2 provides a rear, partial perspective view of an electrical socket 124 of docking station 100. Socket 124 is provided in and/or mounted to, e.g., a rear portion of, base 110. Socket 124 is configured for receiving a plug of beverage dispenser 200 in order to provide electrical power to beverage dispenser 200 and permit operation of beverage dispenser 200. Socket 124 may assist with conserving electrical socket connections within an associated building housing docking station 100 and beverage dispenser 200 and also improve a cosmetic appearance of docking station 100 and beverage dispenser 200 by limiting the number of electrical cords extending from docking station 100 and beverage dispenser 200.

Figure 3:
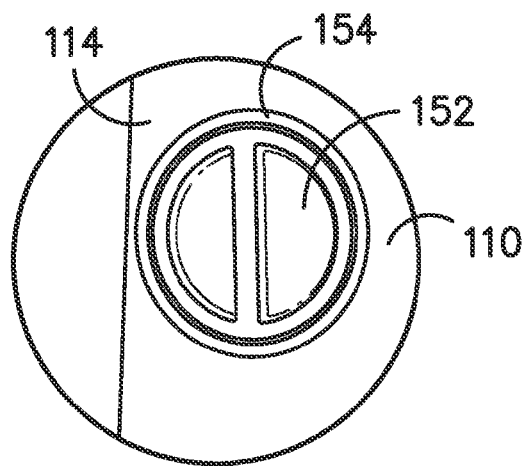
FIG. 3 provides a front, partial perspective view of a switch of the exemplary docking station of FIG. 1.

FIG. 3 provides a front, partial perspective view of a switch 152 of docking station 100. Switch 152 is mounted to, e.g., a front portion of, base 110. Switch 152 is configured for regulating a power supply to various components of docking station 100. For example, when switch 152 is in an off position, power supply to certain components of docking station 100 is interrupted, such as a controller 150, a valve 138, a user notification output 154, a water level sensor 156, a leak detection sensor 158 and an ultraviolet light emitter 160 of docking station 100. Conversely, power supply to certain components of docking station 100 is not interrupted by switch 152 when switch 152 is in an on position. Socket 124 may be powered when switch 152 is in both the off and on positions in order permit independent operation of beverage dispenser 200.

Docking station 100 also includes a user notification output 154 positioned at or adjacent switch 152. In certain exemplary embodiments, user notification output 154 comprises a light emitting diode (LED) or series of LEDs that surround switch 152. However, in alternative exemplary embodiments, user notification output 154 may be any other suitable output for alerting or notifying a user of docking station 100 of certain conditions of docking station 100. For example, user notification output 154 may be a speaker, a buzzer, a liquid crystal display, etc., in alternative exemplary embodiments.

Figure 4:
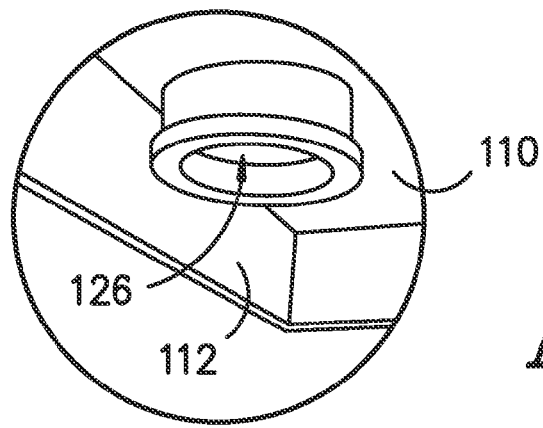
FIG. 4 provides a bottom, partial perspective view of a water conduit opening of the exemplary docking station of FIG. 1.
Figure 6:
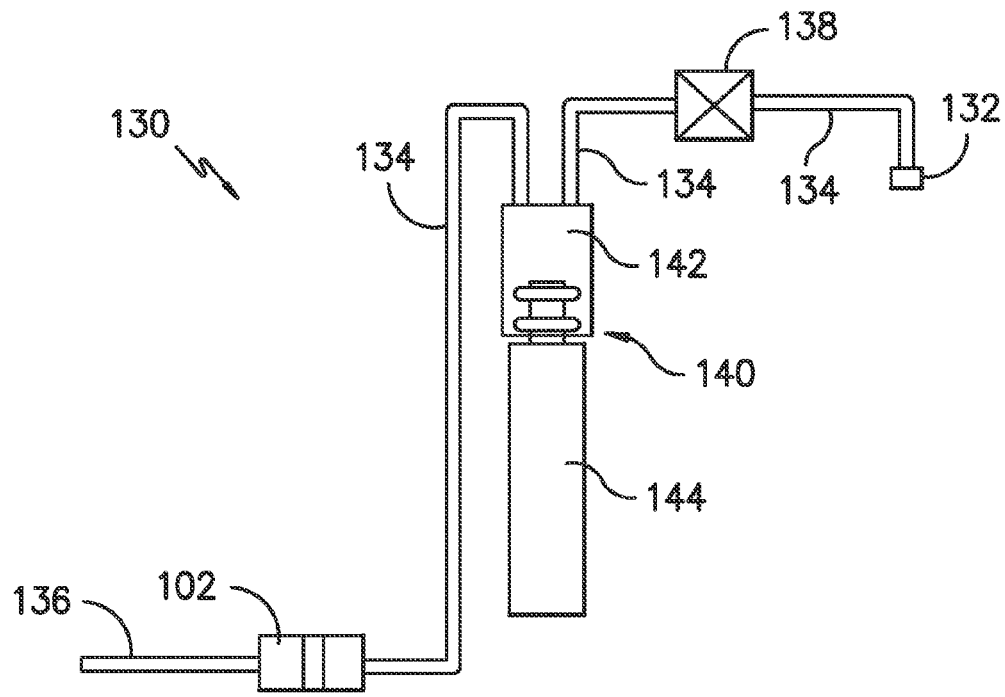
FIG. 6 provides a schematic view of a water supply system of the exemplary docking station of FIG. 1.

FIG. 4 provides a bottom, partial perspective view of a water conduit opening 126 of the exemplary docking station of FIG. 1. As may be seen in FIG. 4, base 110 defines opening 126, e.g., at or adjacent bottom portion 122 of base 110. Opening 126 is sized and positioned for receiving a water supply line 136 of a pressurized water supply system 130 (FIG. 6). Opening 126 and water supply line 136 are discussed in greater detail below.

Figure 5:
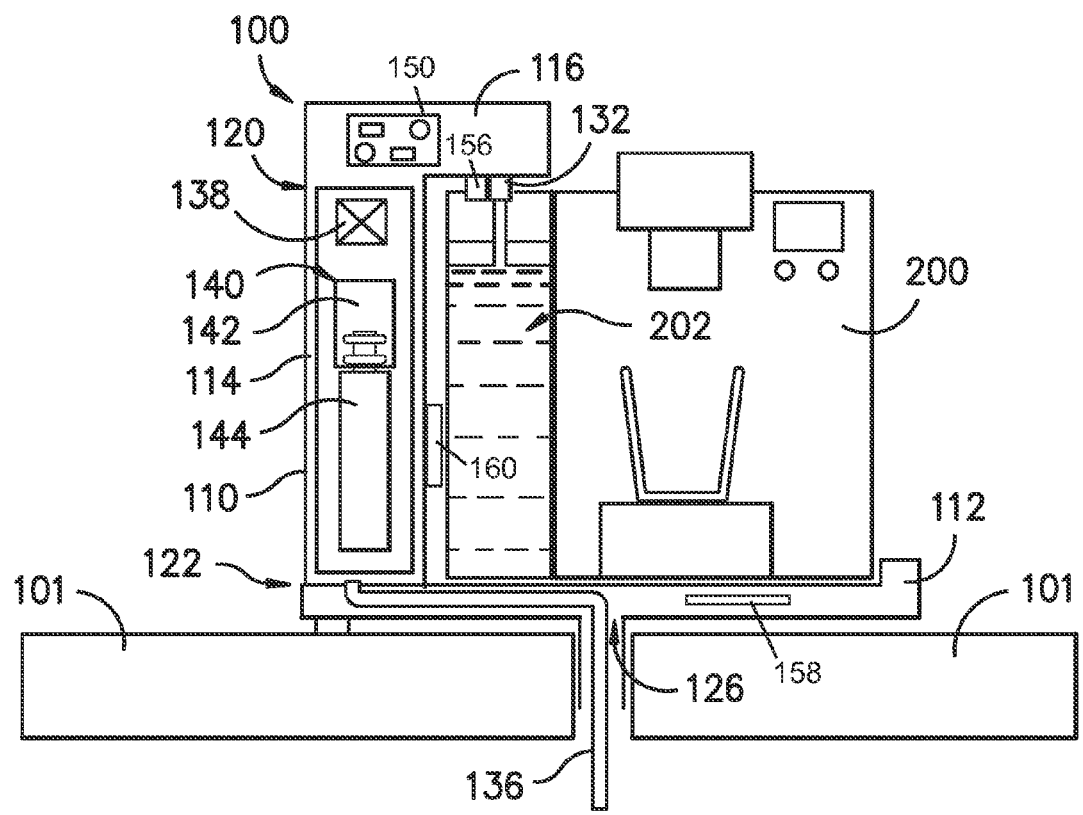
FIG. 5 provides a schematic view of certain components of the exemplary docking station and beverage dispenser of FIG. 1.

FIG. 5 provides a schematic view of certain components of docking station 100 and beverage dispenser 200. FIG. 6 provides a schematic view of water supply system 130 of docking station 100. As may be seen in FIGS. 5 and 6, water supply system 130 includes a spout 132. Spout 132 is mounted to base 110. For example, spout 132 may be positioned on projection 116 of base 110 such that spout 132 is positioned directly over reservoir 202 of beverage dispenser 200. Spout 132 is configured for selectively directing a flow of water into reservoir 202 of beverage dispenser 200.

Water supply system 130 also includes an inlet conduit 134, such as a hose or pipe. Inlet conduit 134 is positioned at least partially within base 110 and extends to spout 132 within base 110. Inlet conduit 134 is configured for connecting to an external pressurized water supply, such as a municipal water supply or well. Inlet conduit 134 directs a flow of water from the pressurized water source to spout 132, and, from spout 132, the flow of water is directed into reservoir 202 of beverage dispenser 200. Thus, inlet conduit 134 may extend between the pressurized water source and spout 132 in order to assist with placing spout 132 in fluid communication with the pressurized water source.

Water from the pressurized water source may be directed to docking station 100 via water supply line 136, e.g., through a countertop 101. Water supply line 136 may be a hose, pipe or other suitable conduit for directing, e.g., pressurized, water to water supply system 130 of docking station 100. Water supply line 136 may enter docking station 100 at opening 126 (FIG. 4) of base 110. Thus, water supply line 136 may extend into base 110 at opening 126 and be coupled or connected to inlet conduit 134 with a union 102 within base 110.

A valve 138 is coupled to inlet conduit 134, e.g., within base 110. Valve 138 is configured for regulating the flow of water through inlet conduit 134 to spout 132. For example, valve 138 permits the flow of water through inlet conduit 134 to spout 132 when valve 138 is open, and valve 138 hinders or obstructs the flow of water through inlet conduit 134 to spout 132 when valve 138 is closed. Thus, valve 138 may open and close in order to adjust the flow of water through inlet conduit 134 to spout 132. Water supply line 136 may be coupled or connected to inlet conduit 134 with valve 138 within base 110.

Water supply system 130 also includes a water filter 140, e.g., positioned with base 110. Water filter 140 is configured for filtering water passing through inlet conduit 134 to spout 132. Thus, water flowing through spout 132 into reservoir 202 of beverage dispenser 200 may be filtered with water filter 140. Water filter 140 can remove impurities and contaminants from water passing through a filtering medium of water filter 140. The filtering medium may be any suitable medium for filtering water such as, e.g., ceramic filters, activated carbon block filters, polymer filters, or reverse osmosis filters, etc.

Water filter 140 may include a manifold 142 and a removable filter cartridge 144. Manifold 142 may be mounted to base 110, e.g., tower 114 of base 110 and be coupled to inlet conduit 134 within base 110. Removable filter cartridge 144 includes a filter medium therein and is removably mounted to manifold 142. Manifold 142 directs the flow of water from inlet conduit 134 into removable filter cartridge 144, and removable filter cartridge 144 filters the flow of water through inlet conduit 134. Removable filter cartridge 144 may include an activated carbon block filter medium in order to facilitate chloramine and/or chlorine reduction in water passing through removable filter cartridge 144. In certain exemplary embodiments, valve 138 may be positioned upstream of water filer 140, e.g., manifold 142 of water filter 140. Thus, valve 138 may be closed to limit the volume of water that flows out of inlet conduit 134, e.g., removable filter cartridge 144 is incorrectly installed on manifold 142 and water filter 140 leaks.

Figure 7:
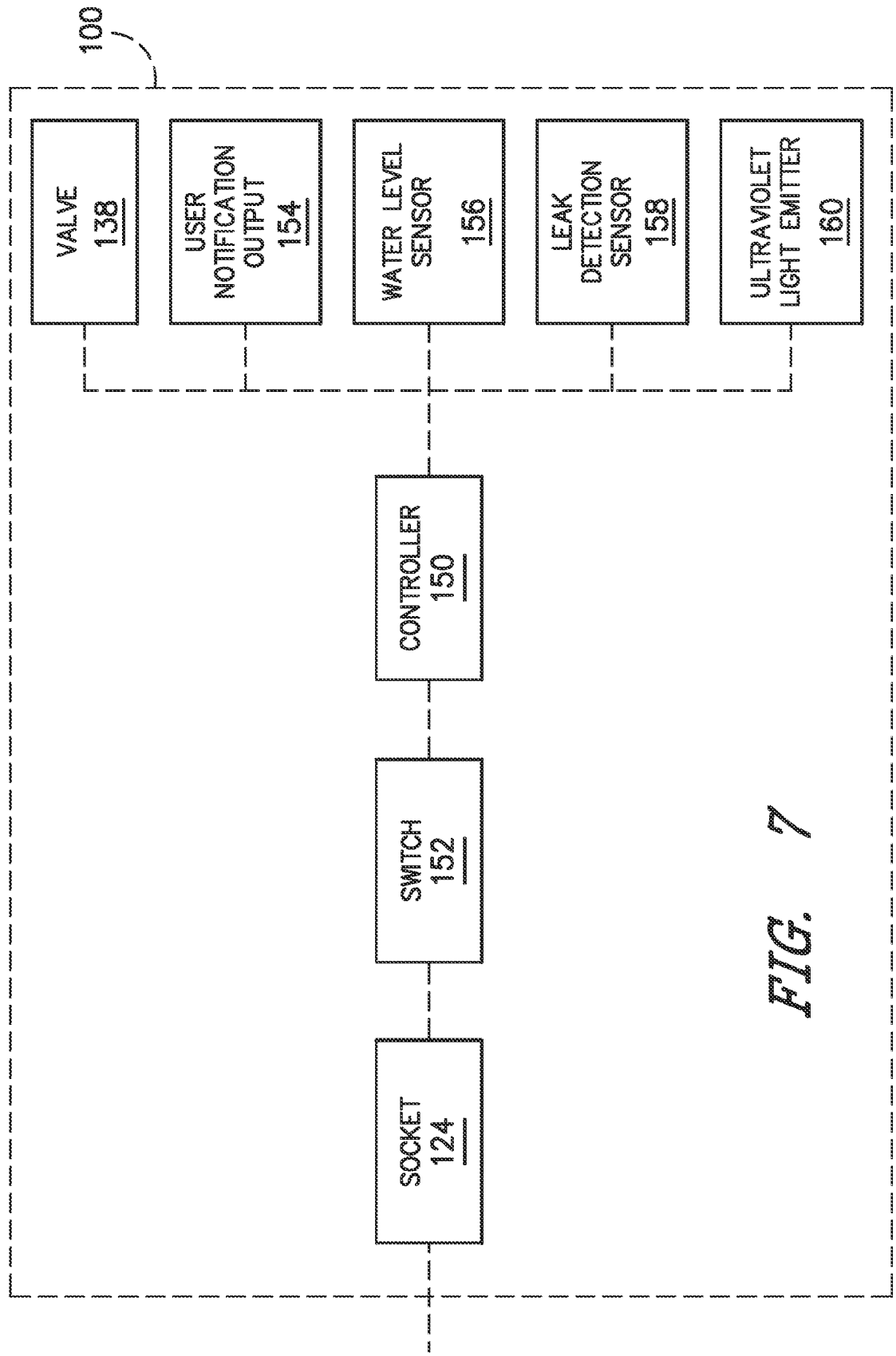
FIG. 7 provides a schematic view certain components of the exemplary docking station of FIG. 1.

FIG. 7 provides a schematic view certain components of docking station 100. As may be seen in FIG. 7, docking station 100 includes a reservoir sensor and/or water level sensor 156. Water level sensor 156 is mounted to base 110, e.g., projection 116 of base 110. Water level sensor 156 is configured for assessing a level of water within reservoir 202 of beverage dispenser 200. Thus, water level sensor 156 may measure the level or height of water within reservoir 202 of beverage dispenser 200 and establish when the level or height of water within reservoir 202 of beverage dispenser 200 is less than a threshold level or height.

Water level sensor 156 may also be configured for detecting whether reservoir 202 of beverage dispenser 200 is positioned adjacent base 110. For example, water level sensor 156 may detect when reservoir 202 of beverage dispenser 200 is positioned below projection 116 of base 110 such that spout 132 is positioned over reservoir 202 and directs the flow of water into reservoir 202. As another example, reservoir 202 may be removable from a base of beverage dispenser 200, and beverage dispenser 200 may be positioned on docking station 100 with reservoir 202 removed from beverage dispenser 200. Thus, water level sensor 156 may detect when reservoir 202 is removed from beverage dispenser 200 in order to avoid directing water from spout 132 onto other components of beverage dispenser 200 or onto tray 112 of docking station 100, as discussed in greater detail below.

Water level sensor 156 may be any suitable type of sensor. For example, water level sensor 156 may be any suitable one or combination of an optical sensor, an infrared sensor, an ultrasonic sensor, an acoustic sensor, a pressure sensor, etc. As discussed above water level sensor 156 may be configured for: (1) assessing the level of water within reservoir 202 of beverage dispenser 200; and (2) detecting whether reservoir 202 of beverage dispenser 200 is positioned adjacent base 110. Water level sensor 156 may include a single sensor component (such as an acoustic sensor) for performing both tasks or may include multiple sensor components (such as an acoustic sensor and a pressure sensor) for performing each task, respectively or in combination.

Docking station 100 also includes an ultraviolet light emitter 160. Ultraviolet light emitter 160 is mounted to base 110, e.g., projection 116 of base 110. Ultraviolet light emitter 160 is configured and/or positioned for selectively directing ultraviolet light into reservoir 202 of beverage dispenser 200. Ultraviolet light emitter 160 may be any suitable type of ultraviolet light source. For example, ultraviolet light emitter 160 may include at least one ultraviolet light emitting diode or mercury lamp. To assist with regulating ultraviolet light emission, base 110 may be constructed of or with an ultraviolet light inhibiting material, such as an organic polymer. Thus, base 110 may block or limit ultraviolet light emission except towards reservoir 202 of beverage dispenser 200.

Docking station 100 also includes a leak detection sensor 158. Leak detection sensor 158 is mounted to base 110, e.g., tray 112 of base 110. Leak detection sensor 158 is configured for detecting liquid water and/or triggering in the presence of liquid water. Leak detection sensor 158 may be positioned at a location on base 110 where liquid water is not present under normal operating conditions of docking station 100 and beverage dispenser 200, e.g., within tray 112 of base 110. Thus, when liquid is detected with leak detection sensor 158, docking station 100 may be deactivated in order to prevent overflowing of reservoir 202 and/or tray 112 and avoid potential damage to adjacent cabinetry, flooring, etc. Leak detection sensor 158 may be any suitable type of sensor. For example, leak detection sensor 158 may be a variable resistance sensor, a variable capacitance sensor, or an RFID sensor as described in U.S. patent application Ser. No. 14/052,873, which is hereby incorporated by reference for all purposes.

Docking station 100 also includes a controller 150. Controller 150 is in operative communication with various components of docking station 100. For example, controller 150 is in operative communication with valve 138, user notification output 154, water level sensor 156, leak detection sensor 158 and ultraviolet light emitter 160. Controller 150 may selectively activate and deactivate such components of docking station 100 in order to regulate operation of docking station 100. For example, controller 150 may open and close valve 138, activate and deactivate user notification output 154, receive signals from water level sensor 156 and leak detection sensor 158, and may activate and deactivate ultraviolet light emitter 160. As a particular example, controller 150 may activate user notification output 154 when the filter medium within removable filter cartridge 144 has expired or otherwise needs to be replaced. For example, controller 150 may keep track of a time interval since removable filter cartridge 144 was last replaced and activate user notification output 154 when the time interval exceeds a replacement time interval, e.g., six months. As another example, controller 150 may record the volume of water that flows through removable filter cartridge 144 and activate user notification output 154 when the volume of water exceeds a replacement volume of water.

Controller 150 includes one or more processors and a memory, and provides docking station functionality. The processor(s) of controller 150 may be any suitable processing device, such as a microprocessor, microcontroller, integrated circuit, or other suitable processing device. The memory of controller 150 may include any suitable computing system or media, including, but not limited to, non-transitory computer-readable media, RAM, ROM, hard drives, flash drives, or other memory devices. The memory of controller 150 can store information accessible by processor(s) of controller 150, including instructions that can be executed by processor(s) of controller 150 in order to operate various components of docking station 100 to provide docking station functionality. Input/output ("I/O") signals may be routed between controller 150 and various operational components of docking station 100 along wiring harnesses that may be routed through base 110.

In certain exemplary embodiments, controller 150 is not in operative communication with any component of beverage dispenser 200. In certain exemplary embodiments, controller 150 also does not receive any command signals from beverage dispenser 200. In such exemplary embodiments, operation of docking station 100 and beverage dispenser 200 may be independent of each other. By not requiring command communication between docking station 100 and the associated beverage dispenser, docking station 100 may function with a variety of beverage dispensers.

In certain exemplary embodiments, docking station 100 may include an additional spout (not shown). The additional spout may be mounted to base 110, e.g., at an opposite side of projection 116 relative to spout 132. The additional spout may be configured for selectively directing an additional flow of water into a tank of another beverage dispenser or a pitcher.

Figure 8:
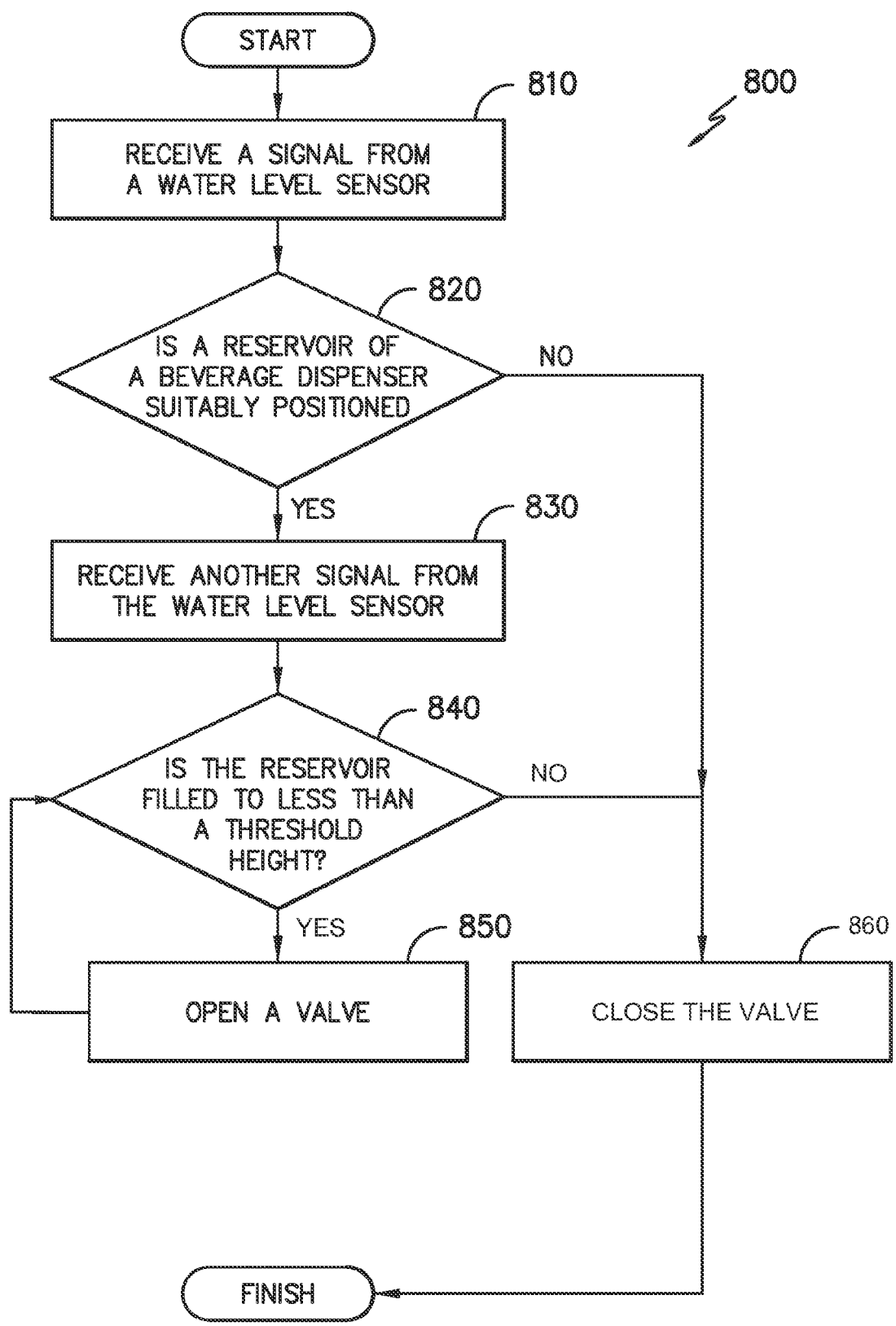
FIG. 8 illustrates a method for operating a docking station for a beverage dispenser having a reservoir according to an exemplary embodiment of the present subject matter.

FIG. 8 illustrates a method 800 for operating docking station 100 according to an exemplary embodiment of the present subject matter. Controller 150 of docking station 100 may be programmed to implement various portions of method 800, as discussed in greater detail below. Utilizing method 800, docking station 100 may operate to fill reservoir 202 of beverage dispenser 200, e.g., without requiring a user of beverage dispenser 200 to manually refill reservoir 202.

At step 810, controller 150 receives a signal from water level sensor 156. As an example, controller 150 may receive a first signal from water level sensor 156 at step 810 when water level sensor 156 detects that reservoir 202 is positioned at or adjacent base 110 and/or below spout 132. As another example, controller 150 may receive a second, different signal from water level sensor 156 at step 810 when water level sensor 156 does not detect reservoir 202 positioned at or adjacent base 110 and/or below spout 132. At step 820, controller 150 determines whether reservoir 202 is suitably positioned, e.g., at or adjacent base 110. The signal from water level sensor 156 received at step 810 may be used to determine whether reservoir 202 is suitably positioned at step 820, as discussed above. Thus, signals from water level sensor 156 may permit controller 150 to determine when reservoir 202 is positioned for receiving the flow of water from spout 132.

At step 830, controller 150 receives another signal from water level sensor 156 if reservoir 202 is suitably positioned at step 820. As an example, controller 150 may receive a third signal from water level sensor 156 at step 830 when liquid fills reservoir 202 of beverage dispenser 200 above a threshold height. As another example, controller 150 may receive a fourth, different signal from water level sensor 156 at step 830 when liquid does not fill reservoir 202 of beverage dispenser 200 above the threshold height. At step 840, controller 150 determines whether liquid fills reservoir 202 to a level below a threshold height. The signal from water level sensor 156 received at step 830 may be used to determine whether liquid fills reservoir 202 to a level below the threshold height, as discussed above. Thus, signals from water level sensor 156 may permit controller 150 to determine a level of liquid within reservoir 202, e.g., in order to determine when reservoir 202 needs to be replenished with liquid from spout 132.

At step 850, controller 150 opens valve 138 if the level of liquid within reservoir 202 is less than the threshold height. With valve 138 open, water from the pressurized water source flows through inlet conduit 134 to spout 132 and into reservoir 202. As beverage dispenser 200 utilizes water within reservoir 202 for beverage preparation, the level of liquid within reservoir 202 decreases and reservoir 202 is depleted. At step 850, water from the pressurized water source may replace the depleted water. In such a manner, reservoir 202 may be replenished with water, e.g., when the level of liquid within reservoir 202 is less than the threshold height.

At step 860, controller 150 closes valve 138 in order to terminate the flow of water from spout 132 and into reservoir 202. Step 860 may be performed at any suitable time after step 850. For example, controller 150 may close valve 138 at step 860 when a predetermined time interval has elapsed after step 850. The predetermined time interval may correspond to a period of time required to fill reservoir 202 from the threshold height. As another example, controller 150 may monitor the level of liquid within reservoir 202 with water level sensor 156 and may close valve 138 at step 860 when water level sensor 156 detects that reservoir 202 is full.

At step 860, valve 138 may also be kept closed, e.g., if reservoir 202 is not suitably positioned at step 820 or the level of liquid within reservoir 202 is greater than or equal to the threshold height at step 840. Thus, controller 150 does not open valve 138 if reservoir 202 is not suitably positioned at step 820 or the level of liquid within reservoir 202 is greater than or equal to the threshold height at step 840. Keeping valve 138 closed may assist with preventing or limiting water spillage from spout 132 and/or with conserving water. For example, if reservoir 202 is not suitably positioned below spout 132 at step 820, keeping valve 138 closed prevents or limits water spillage from spout 132 into tray 112 or components of beverage dispenser 200. Similarly, if the level of liquid within reservoir 202 is greater than or equal to the threshold height at step 840, reservoir 202 does not need replenishment and keeping valve 138 closed prevents or limits filling reservoir 202 needlessly.

It should be understood that in certain exemplary embodiments, docking station 100 may have a manual fill user input, such as a button or switch, in lieu of or in addition to the automatic filling provided by method 800. Controller 150 may be in operative communication with the manual fill user input. Controller 150 may open valve 138 after receiving a signal from the manual fill user input and, e.g., may close valve 138 when the signal from the manual fill user input is terminated or when a predetermined time interval has elapsed after receiving the signal from the manual fill user input. Thus, a user of docking station 100 may be provided with a means for manually initiating filling of reservoir 202 with docking station 100.

Figure 9:
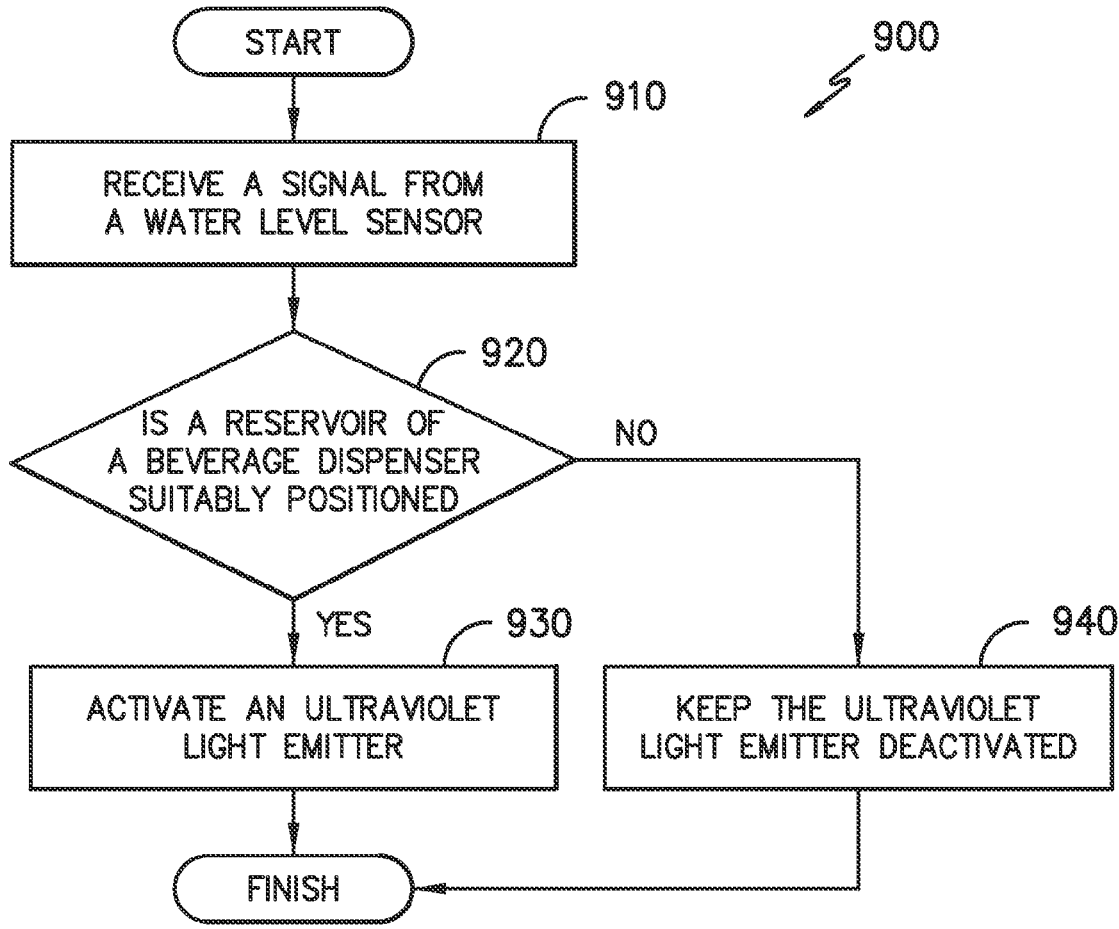
FIG. 9 illustrates a method for operating a docking station for a beverage dispenser having a reservoir according to another exemplary embodiment of the present subject matter.

FIG. 9 illustrates a method 900 for operating docking station 100 according to another exemplary embodiment of the present subject matter. Controller 150 of docking station 100 may be programmed to implement various portions of method 900, as discussed in greater detail below. Utilizing method 900, docking station 100 may operate to sanitize water within reservoir 202 of beverage dispenser 200.

At step 910, controller 150 receives a signal from water level sensor 156. As an example, controller 150 may receive a first signal from water level sensor 156 at step 910 when water level sensor 156 detects that reservoir 202 is positioned at or adjacent base 110 and/or below spout 132. As another example, controller 150 may receive a second, different signal from water level sensor 156 at step 910 when water level sensor 156 does not detect reservoir 202 positioned at or adjacent base 110 and/or below spout 132. At step 920, controller 150 determines whether reservoir 202 is suitably positioned, e.g., at or adjacent base 110. The signal from water level sensor 156 received at step 910 may be used to determine whether reservoir 202 is suitably positioned at step 920, as discussed above. Thus, signals from water level sensor 156 may permit controller 150 to determine when reservoir 202 is positioned for receiving the flow of water from spout 132.

At step 930, controller 150 activates ultraviolet light emitter 160 if reservoir 202 is suitably positioned at step 920. Ultraviolet light from ultraviolet light emitter 160 is directed into or towards reservoir 202 during step 930, and the ultraviolet light from ultraviolet light emitter 160 assist with sanitizing liquid within reservoir 202, e.g., by limiting or hindering bio-growth within liquid in reservoir 202. As discussed above, water filter 140 may remove or reduce chlorine and/or chloramine within the flow of water from spout 132 into reservoir 202. Similarly, chlorine and/or chloramine within liquid in reservoir 202 may dissipate over time. Thus, ultraviolet light from ultraviolet light emitter 160 may assist with sanitizing liquid within reservoir 202, e.g., despite limited or reduced chlorine and/or chloramine levels in the liquid.

At step 930, ultraviolet light emitter 160 is kept deactivated if reservoir 202 is not suitably positioned at step 920. Thus, controller 150 may not activate ultraviolet light emitter 160 if reservoir 202 is not suitably positioned at step 920. In such a manner, excess or unnecessary operation of ultraviolet light emitter 160 may be reduced or prevented, and energy consumption of ultraviolet light emitter 160 may be reduced and excess or unregulated ultraviolet light emissions may be prevented.

Figure 10:
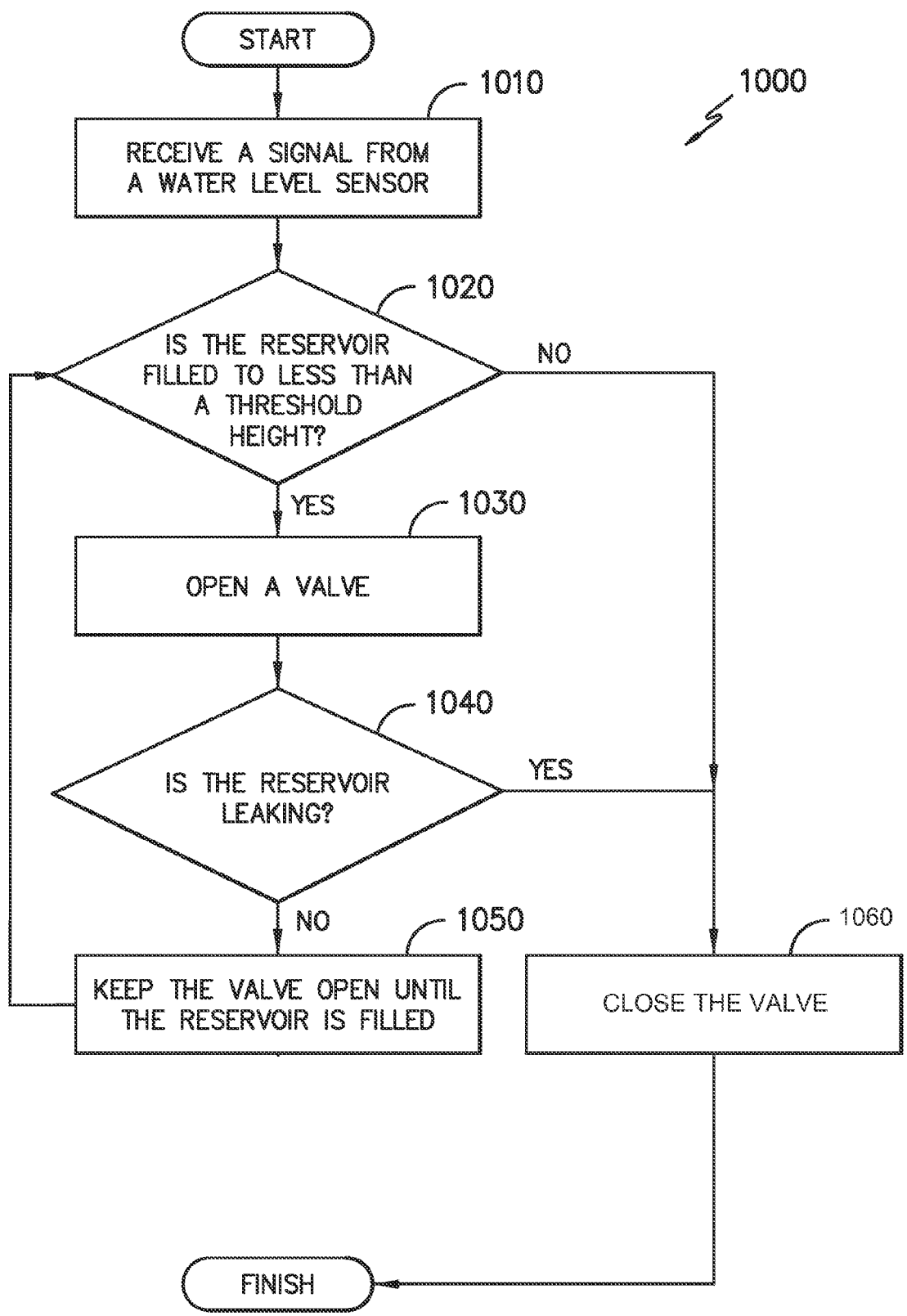
FIG. 10 illustrates a method for operating a docking station for a beverage dispenser having a reservoir according to an additional exemplary embodiment of the present subject matter.

FIG. 10 illustrates a method 1000 for operating docking station 100 according to an additional exemplary embodiment of the present subject matter. Controller 150 of docking station 100 may be programmed to implement various portions of method 1000, as discussed in greater detail below. Utilizing method 1000, docking station 100 may recognize when docking station 100 and/or beverage dispenser 200 are leaking and deactivate filling features of docking station 100 in such conditions.

At step 1010, controller 150 receives a signal from water level sensor 156. As an example, controller 150 may receive a first signal from water level sensor 156 at step 1010 when liquid fills reservoir 202 of beverage dispenser 200 above a threshold height. As another example, controller 150 may receive a second, different signal from water level sensor 156 at step 1010 when liquid does not fill reservoir 202 of beverage dispenser 200 above the threshold height. At step 1020, controller 150 determines whether liquid fills reservoir 202 to a level below a threshold height. The signal from water level sensor 156 received at step 1010 may be used to determine whether liquid fills reservoir 202 to a level below the threshold height, as discussed above. Thus, signals from water level sensor 156 may permit controller 150 to determine a level of liquid within reservoir 202, e.g., in order to determine when reservoir 202 needs to be replenished with liquid from spout 132.

At step 1030, controller 150 opens valve 138 if the level of liquid within reservoir 202 is less than the threshold height. With valve 138 open, water from the pressurized water source flows through inlet conduit 134 to spout 132 and into reservoir 202. As beverage dispenser 200 utilizes water within reservoir 202 for beverage preparation, the level of liquid within reservoir 202 decreases and reservoir 202 is depleted. At step 1030, water from the pressurized water source may replace the depleted water. In such a manner, reservoir 202 may be replenished with water, e.g., when the level of liquid within reservoir 202 is less than the threshold height.

At step 1040, controller 150 determines whether reservoir 202 or another component of beverage dispenser 200 is leaking and/or if docking station 100 is otherwise malfunctioning. For example, if leak detection sensor 158 detects liquid within tray 112 at step 1040, water may be leaking from reservoir 202 or another component of beverage dispenser 200. As another example, if valve 138 has been open for more than a predetermined amount of time that corresponds to an amount of time required to fill reservoir 202 then water may be leaking from reservoir 202 or another component of beverage dispenser 200. In such a manner, controller 150 may determine whether reservoir 202 or another component of beverage dispenser 200 is leaking and/or if docking station 100 is otherwise malfunctioning at step 1040.

If reservoir 202 or another component of beverage dispenser 200 is not leaking step 1040, method 1000 continues to replenish reservoir 202 with water from spout 132. Thus, controller 150 keeps valve 138 open at step 1050 and then closes valve 138 at step 1060 in order to terminate the flow of water from spout 132 and into reservoir 202. Step 1060 may be performed at any suitable time after step 1030. For example, controller 150 may close valve 138 at step 1060 when a predetermined time interval has elapsed after step 1030. The predetermined time interval may correspond to a period of time required to fill reservoir 202 from the threshold height. As another example, controller 150 may monitor the level of liquid within reservoir 202 with water level sensor 156 and may close valve 138 at step 1060 when water level sensor 156 detects that reservoir 202 is full.

At step 1060, valve 138 may also be kept closed, e.g., if the level of liquid within reservoir 202 is greater than or equal to the threshold height at step 1020 or if reservoir 202 or another component of beverage dispenser 200 is leaking and/or if docking station 100 is otherwise malfunctioning at step 1040. Thus, controller 150 does not open valve 138 if the level of liquid within reservoir 202 is greater than or equal to the threshold height at step 1020. In addition, controller 150 keeps valve 138 closed if reservoir 202 or another component of beverage dispenser 200 is leaking and/or if docking station 100 is otherwise malfunctioning at step 1040. Keeping valve 138 closed may assist with preventing or limiting water spillage from spout 132 and/or with conserving water. For example, if reservoir 202 is not suitably positioned below spout 132 at step 1040, keeping valve 138 closed prevents or limits water spillage from spout 132 into tray 112 or components of beverage dispenser 200.

While described above in the context of docking station 100 and beverage dispenser 200, it should be understood that methods 800, 900 and 1000 may be used within any suitable beverage dispenser and/or docking station. For example, in alternative exemplary embodiments, docking station 100 may include a tank mounted to base 110 and docking station 100 may not be connected to a pressurized water supply. The tank may be filled with liquid water, and a supply conduit may extend from the tank to spout 132. A pump positioned within base 110 may be coupled to the supply conduit and be operable to urge a flow of water from the tank to spout 132 via the supply conduit. Controller 150 may selectively activate the pump in order to refill reservoir 202, e.g., in the manner described above for valve 138. Thus, docking station 100 need not be connected to a pressurized water supply in order to refill reservoir 202 in certain exemplary embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A docking station for a beverage dispenser having a reservoir, comprising:
   a base having a tower and a projection extending from the tower, the projection configured to be positioned over the reservoir of the beverage dispenser;
   a spout mounted to the base, the spout configured for selectively directing a flow of water into the reservoir of the beverage dispenser, the spout positioned on the projection;
   an inlet conduit extending to the spout within the base, the inlet conduit configured for connecting to a pressurized water supply in order to direct the flow of water to the spout from the pressurized water supply;
   a valve coupled to the inlet conduit, the valve configured for regulating the flow of water through the inlet conduit to the spout; and
   a removable water filter positioned within the base and coupled to the inlet conduit in order to filter the flow of water through the inlet conduit.

2. The docking station of claim 1, wherein the base includes a flexible neck that extends between the tower of the base and the projection of the base in order to pivotally couple the projection to the tower.

3. The docking station of claim 1, further comprising a water level sensor mounted to the base and a controller, the water level sensor configured for assessing a level of water within the reservoir of the beverage dispenser, the controller in operative communication with the valve and the water level sensor, the controller configured for receiving a signal from the water level sensor when level of water within the reservoir of the beverage dispenser is less than a threshold level and for opening the valve in order to direct the flow of water into the reservoir via the spout after receiving the signal from the water level sensor.

4. The docking station of claim 3, wherein the water level sensor is an optical sensor, an infrared sensor, an ultrasonic sensor, an acoustic sensor or a pressure sensor.

5. The docking station of claim 3, wherein the controller is not in operative communication with any component of the beverage dispenser and the controller does not receive any command signals from the beverage dispenser.

6. The docking station of claim 1, further comprising an additional spout mounted to the base, the additional spout configured for selectively directing an additional flow of water into a tank of another beverage dispenser or a pitcher.

7. The docking station of claim 1, further comprising a user notification output and a controller, the controller configured for activating the user notification output when the removable water filter is expired.

8. The docking station of claim 1, wherein the removable water filter comprises a carbon block filter medium.

9. The docking station of claim 1, further comprising a manual fill user input mounted to the base and a controller, the controller in operative communication with the manual fill user input and the water level sensor, the controller configured for receiving a signal from the manual fill user input and for opening the valve in order to direct the flow of water into the reservoir via the spout after receiving the signal from the manual fill user input.

10. A docking station for a beverage dispenser having a reservoir, comprising:
    a base;
    a spout mounted to the base such that the spout is positioned for selectively directing a flow of water into the reservoir of the beverage dispenser;
    an inlet conduit at least partially disposed within the base, the inlet conduit configured for extending between an external pressurized water source and the spout through the base, the inlet conduit configured for connecting to the external pressurized water supply in order to direct the flow of water to the spout from the pressurized water supply;
    a valve positioned within the base, the valve coupled to the inlet conduit, the valve configured for opening and closing in order to adjust the flow of water through the inlet conduit to the spout;
    a manifold mounted to the base and coupled to the inlet conduit; and
    a removable water filter cartridge mounted to the manifold such that the manifold directs the flow of water into the removable water filter cartridge, the removable water filter cartridge filtering the flow of water through the inlet conduit;
    a water level sensor mounted to the base, the water level sensor configured for assessing a level of water within the reservoir of the beverage dispenser; and
    a controller in operative communication with the valve and the water level sensor, the controller configured for receiving a signal from the water level sensor when level of water within the reservoir of the beverage dispenser is less than a threshold level and for opening the valve in order to direct the flow of water into the reservoir via the spout after receiving the signal from the water level sensor,
    wherein the controller is not in operative communication with any component of the beverage dispenser and the controller does not receive any command signals from the beverage dispenser.

11. The docking station of claim 10, wherein the base includes a tower and a projection extending from the tower, the projection configured to be positioned over the reservoir of the beverage dispenser, the spout positioned on the projection.

12. The docking station of claim 11, wherein the base includes a flexible neck that extends between the tower of the base and the projection of the base in order to pivotally couple the projection to the tower.

13. The docking station of claim 10, wherein the water level sensor is an optical sensor, an infrared sensor, an ultrasonic sensor, an acoustic sensor or a pressure sensor.

14. The docking station of claim 10, further comprising an additional spout mounted to the base, the additional spout configured for selectively directing a flow of water into a tank of another beverage dispenser or a pitcher.

15. The docking station of claim 10, further comprising a user notification output and a controller, the controller configured for activating the user notification output when the removable water filter cartridge is expired.

16. The docking station of claim 10, wherein the removable water filter cartridge comprises a carbon block filter medium.

17. The docking station of claim 10, further comprising a manual fill user input mounted to the base and a controller, the controller in operative communication with the manual fill user input and the water level sensor, the controller configured for receiving a signal from the manual fill user input and for opening the valve in order to direct the flow of water into the reservoir via the spout after receiving the signal from the manual fill user input.

* * * * *